(12) United States Patent
Jansson

(10) Patent No.: US 7,535,382 B2
(45) Date of Patent: May 19, 2009

(54) HIGH SPEED QUADRATURE COUNTER

(75) Inventor: Bjorn E. B. Jansson, Snohomish, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 316 days.

(21) Appl. No.: 11/590,960

(22) Filed: Oct. 31, 2006

(65) Prior Publication Data

US 2008/0117086 A1 May 22, 2008

(51) Int. Cl.
*H03M 1/22* (2006.01)

(52) U.S. Cl. .............................. 341/10; 341/13; 341/17; 341/35; 341/116; 341/117

(58) Field of Classification Search .................... 341/10, 341/13, 16–17, 35, 110–117, 192
See application file for complete search history.

(56) References Cited

U.S. PATENT DOCUMENTS

| | | | | |
|---|---|---|---|---|
| 3,984,831 A * | 10/1976 | Jones et al. | .................. | 341/116 |
| 4,215,300 A * | 7/1980 | Schmidt | ...................... | 318/603 |
| 4,535,372 A * | 8/1985 | Yeakley | .................... | 360/77.05 |
| 4,547,667 A * | 10/1985 | Sasaki et al. | ........... | 250/231.16 |
| 4,580,047 A * | 4/1986 | Sasaki et al. | ........... | 250/231.16 |
| 4,599,600 A * | 7/1986 | McGuire et al. | ............... | 341/6 |
| 4,628,298 A | 12/1986 | Hafle | | |
| 4,691,192 A * | 9/1987 | Baker | .......................... | 341/11 |
| 4,714,913 A * | 12/1987 | Cohen | ........................ | 341/111 |
| 4,779,211 A * | 10/1988 | March | ........................ | 702/150 |
| 4,782,329 A * | 11/1988 | Iijima et al. | ..................... | 341/6 |
| 4,811,254 A * | 3/1989 | Iijima et al. | ..................... | 341/6 |
| 5,136,561 A * | 8/1992 | Goker | ..................... | 369/30.17 |
| 5,142,226 A * | 8/1992 | Sakamoto et al. | ...... | 324/207.24 |
| 5,214,426 A * | 5/1993 | Minohara et al. | ............. | 341/13 |
| 5,428,355 A * | 6/1995 | Jondrow et al. | ............... | 341/20 |
| 5,438,330 A * | 8/1995 | Yamazaki et al. | ............. | 341/11 |
| 5,646,496 A * | 7/1997 | Woodland et al. | ........... | 318/632 |
| 5,825,307 A * | 10/1998 | Titus et al. | ..................... | 341/13 |
| 6,163,430 A * | 12/2000 | Hansen | ..................... | 360/78.06 |
| 6,426,845 B1 * | 7/2002 | Sacks et al. | .............. | 360/77.08 |
| 6,525,675 B2 * | 2/2003 | Rodi | .......................... | 341/13 |
| 6,556,153 B1 * | 4/2003 | Cardamone | .................. | 341/111 |
| 7,015,832 B2 * | 3/2006 | Madni et al. | ................... | 341/11 |
| 7,203,718 B1 * | 4/2007 | Fu et al. | ..................... | 708/622 |
| 7,457,076 B2 * | 11/2008 | Semba et al. | ............. | 360/78.06 |

* cited by examiner

*Primary Examiner*—Linh V Nguyen
(74) *Attorney, Agent, or Firm*—Christensen O'Connor Johnson Kindness PLLC

(57) ABSTRACT

A high speed quadrature counter for use with a displacement measuring device is disclosed. The counter provides high speed counting by partitioning the tracking counter into a small fast tracking counter portion for the LSBs and a larger slow tracking counter portion for the MSBs. The fast tracking counter portion outputs a smaller number of bits according to a fast clock rate, while the slow tracking counter portion outputs a larger number of bits to update the remainder of the position at a slower clock rate. In various embodiments, the counter provides a corrected position value that has an effective timing within a few fast clock cycles of the time of the latch trigger signal. A corrected latched position circuit corrects an error that may otherwise be produced by the partitioning and the different clock rates of the fast and slow tracking counter portions.

12 Claims, 3 Drawing Sheets

HIGH SPEED QUADRATURE COUNTER

FIELD OF THE INVENTION

The invention relates generally to precision displacement measurement instruments, and more particularly to a high speed quadrature counter such as may be utilized with a position encoder or other displacement measuring device.

BACKGROUND OF THE INVENTION

Various position encoders for sensing linear, rotary or angular movement are currently available. These encoders are generally based on inductive, capacitive, optical, or magnetic transducers. In general, such encoders typically comprise a transducer comprising a readhead and a scale that includes a periodic structure having a characteristic spatial wavelength. The readhead may comprise a transducer element and some transducer electronics. The transducer output signals vary as a function of the position of the readhead relative to the scale along a measuring axis. The transducer electronics may output raw position signals to a signal processor or, process the raw signals internally and output modified signals indicative of the position of the readhead relative to the scale. It is also common for an encoder system to include an interface electronics separate from the readhead, and to interpolate or otherwise processes the transducer signals in the interface electronics before outputting modified signals indicative of the position of the readhead relative to the scale to an external host system, such as a motion control system or other data acquisition system.

Many conventional position encoder systems output either raw or modified position signal information in the form of two quadrature signals. As an example, a two-phase transducer may provide two raw position signals S1 and S2 that vary sinusoidally as a function of the position of the readhead relative to the scale along the measuring axis. In general, the signals S1 and S2 are intended to be identical except for a quarter-wavelength (quadrature) spatial phase difference between them. The relationship between the instantaneous values of the quadrature signals may be used to derive the instantaneous position of the readhead relative to the scale along the measuring axis, within a current period of the scale's spatial wavelength. In many encoders, such sinusoidal signals are passed through a threshold circuit to provide digital quadrature signals, that is, periodic square wave signals having a 90° spatial phase difference. In many other encoders and/or interface circuits the ratio between such sinusoidal signals, which behaves as a tangent function that depends on the position of the readhead along the scale, is analyzed to determine an "interpolated" position with a high resolution that is much finer than the scale wavelength (e.g. sub-micron resolution). However, because many motion control systems are designed to receive position information in the form of digital quadrature signals, it remains conventional to output such interpolated position information in the form of periodic digital quadrature signals. Interferometer systems are another type of device that may output very high resolution quadrature signals.

Regardless of the device that generates the quadrature signals, in order to keep track of such periodic quadrature signals and determine an accumulated total displacement value at any point in time, host systems such as displacement measuring systems, motion control systems, and the like, typically use a so-called quadrature counter. A quadrature counter, which includes a tracking counters, is utilized to decode the quadrature signals and to keep track of the changing position of the encoder. U.S. Pat. No. 4,599,600 to McGuire, et al., and U.S. Pat. No. 4,628,298 to Hafle et al., each of which is incorporated herein by reference, describe various aspects of quadrature decoding and related counters.

However, the trend in position encoders and other displacement measuring devices is to support increasing position resolution and higher motion speed. This makes the tracking counter a critical component of a position or displacement measuring system, in that its size (number of bits) and speed can limit the overall system capability. In other words, in order for the system to have a desirable level of position resolution while following relatively high speed motion, the tracking counter may need to be large and may be required to have a relatively high speed. It is also desirable for the tracking counter to have a relatively low cost so that the overall position encoder is economical. Conventional design techniques for such counters tend to produce a counting frequency which is too slow. As a specific example, a present FPGA counter with a desired cost-point (e.g. $15) with a desired resolution (e.g. 32 bit), may have a limited counting frequency (e.g. 20-40 MHz), whereas a desirable counting frequency would be higher (e.g. 100 MHz or more).

The present invention is directed to a quadrature counter that overcomes the foregoing and other disadvantages. More specifically, the present invention is directed to a high speed quadrature counter that is economical and is able to produce a desired counting frequency.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A high speed quadrature counter is disclosed. In accordance with one aspect of the invention, the counter speed is provided by subdividing the tracking counter into at least two smaller counter portions, including a small fast tracking counter portion and a larger slower tracking counter portion. The small fast tracking counter is able to output a smaller number of least significant bits at a fast clock rate and thus provide a rapidly updated count for least significant bits of the position, while the slower tracking counter outputs a larger number of more significant bits to update the more significant bits of the position at a slower clock rate. In one embodiment, the fast tracking counter includes an EXOR gate, a flip-flop register, a digital comparator and an up-down counter. In one embodiment, the slow tracking counter includes first and second flip-flop registers, a digital comparator, and an up-down counter. The fast tracking counter is relatively small in that it outputs only a small number of bits (e.g. four bits) while the slow tracking counter is relatively large in that it outputs a relatively larger number of bits (e.g. twenty-eight bits). The outputs of the fast and slow tracking counters are combined to provide an overall tracking counter output with a number of bits corresponding to the sum of their individual number of bits.

In accordance with another aspect of the invention, in one embodiment, during the operation of the overall tracking counter incoming quadrature signals A and B are provided to the fast tracking counter. The quadrature signals are decoded into a two bit binary position by using the EXOR gate. The flip-flop register inputs the two bit binary position information and its output provides a "memory" so that the two bit binary position information from the previous clock cycle may be output to the digital comparator and compared to the current two bit position information. The output of the flip-flop register also provides the two least-significant bits of the position that is output by the fast tracking counter. The up-down counter is controlled by outputs from the comparator to provide additional bits to extend the position. When the new two bit position is not identical to the previous two bit position, the digital comparator detects in which direction the position has changed (up or down), and directs the up-down counter to increment or decrement as necessary to follow, or track, the changing position. The position is output from the fast tracking counter at a fast clock rate (e.g. in one example embodiment at a rate of 200 MHz).

In accordance with another aspect of the invention, in one embodiment, the position from the fast tracking counter is input to the slow tracking counter where it is down-sampled by the first flip-flop register at the slow clock rate. The second flip-flop register inputs the four bit binary position information from the first flip-flop register and its output provides a "memory" so that the four bit binary position information from the previous clock cycle may be output to the digital comparator and compared to the current four bit position information. The output of the second flip-flop register also provides the four least-significant bits of the position that is output by the slow tracking counter. The up-down counter is controlled by outputs from the digital comparator. The digital comparator detects the changes in the four bit position based on inputs from the first and second flip-flops and directs the slow tracking counter for the large number of more-significant bits to increment or decrement as necessary to track the changes in the four bit position from the first flip-flop.

In accordance with another aspect of the invention, the slow clock is M times slower than the fast clock, and the fast tracking counter outputs N bits of position information, and $2^{(N-1)}>M$. In accordance with a further embodiment of the invention, M=6 and N=4.

In accordance with another aspect of the invention, a position corrected latch system for the overall tracking counter includes a fast latch, a slow latch and a corrected latched position component. In one embodiment, the corrected latched position component is utilized to insure that the slow latch position is adjusted to match the fast latch position, thus eliminating any "asynchronous" error that might otherwise arise in the overall position output due to the partitioning and/or different clock rates of the fast and slow tracking counters. The resulting corrected latched position is output from the position corrected latch and in one embodiment is made available to a host computer via a USB interface.

In accordance with another aspect of the invention, in various embodiments, the slow clock is M times slower than the fast clock, and the fast tracking counter outputs N bits of position information, and $2^{(N-1)}>M$. In accordance with a further aspect of the invention, in one embodiment, the corrected latched position component corrects the slow latch position based on the difference between only the N LSBs of the fast latch and slow latch positions. In accordance with a further aspect of the invention, in one embodiment, M=6 and N=4. In accordance with another aspect of the invention, in one embodiment, all quadrature signal position information input to the tracking counter up to the time of the latch signal's active edge is allowed to propagate through the fast tracking counter operations until the fast latch input reflects that position information, before the fast latching operation is performed. The resulting latched position accurately represents the quadrature signal position information at the time of the active edge of the latch signal, within a very small time period tolerance (e.g. one fast clock cycle).

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
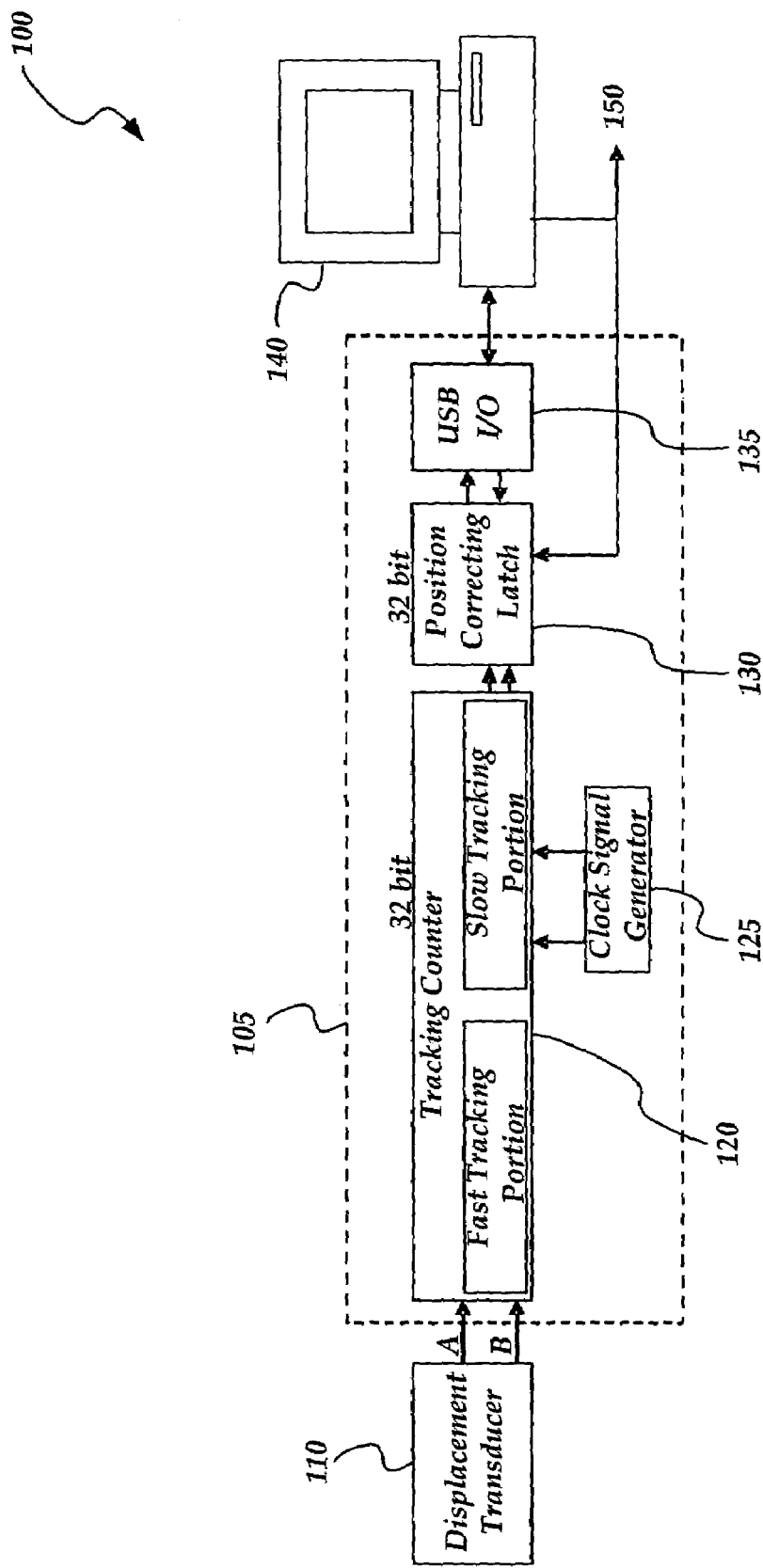
FIG. 1 is a block diagram of an displacement measuring system including a quadrature counter with a tracking counter and position correcting latch according to this invention.

FIG. 1 is a block diagram of displacement measuring system 100 including a quadrature counter 105, a displacement transducer 110 that outputs quadrature signals, and an external host computer 140. The quadrature counter 105 may include a tracking counter 120, a clock signal generator 125, a position correcting latch 130 and a USB interface 135. In one specific example embodiment, the tracking counter 120 and position correcting latch 130 may provide 32 bits of position information, and the clock signal generator 125 may provide a fast clock rate of 200 MHz, or more. As will be described in more detail below with respect to FIG. 2, in accordance with the present invention, in one embodiment the tracking counter 120 is partitioned into fast and slow tracking counter portions.

The displacement transducer 110 may comprise a position encoder (with or without an interface circuit), or an interferometer system, or the like. As the displacement transducer moves 110 moves, it outputs quadrature signals A and B. During the operation of the displacement measuring system 100, the quadrature counter 105 inputs the quadrature signals A and B, and keeps track of the changing position of the displacement transducer 110. The position information provided by tracking counter 120 can be latched by the position correcting latch 130 (e.g. copied to or frozen in a position register), at a time determined by a signal provided on the USB interface 135 from the host computer 140, or by an external hardware trigger signal providing on an optional signal line or bus 150. The latched position information may subsequently be corrected or confirmed by the position correcting latch 130 and read out by the host computer 140 through the USB interface 135 and/or by the external hardware (not shown) connected to the optional signal line or bus 150. The external hardware may comprise a motion controller, for example.

The tracking counter 120 may be critical component in the system 100, in that its counting range (i.e. its number of bits) and speed can limit the overall system capabilities. For example, if the displacement transducer 110 provides a position resolution of 5 nm and is operated at a of speed of 1 m/s, the count-rate of the tracking counter 120 must be at least 200 MHz, and the tracking counter must be large (e.g. thirty-two bit to provide a measuring range of 11 meters or more). However, conventionally designed and economically practical counters have a limited counting frequency. As a specific example, for one FPGA counter having a practical cost (e.g. $15) and a desired resolution (e.g. thirty-two bit), the counting frequency is limited to approximately 20-40 MHz, whereas the required counting frequency four applications may be approximately 200 MHz, as outlined above. As will be described in more detail below with respect to FIG. 2, in accordance with the present invention a faster overall counter may be produced by subdividing the tracking counter into a small fast tracking counter portion and a larger slower tracking counter portion. Additionally, a position correcting latch circuit may be implemented so as to work with the partitioned tracking counter to eliminate errors that might otherwise occur due to a lack of synchronization between various bits of position information.

Figure 2:
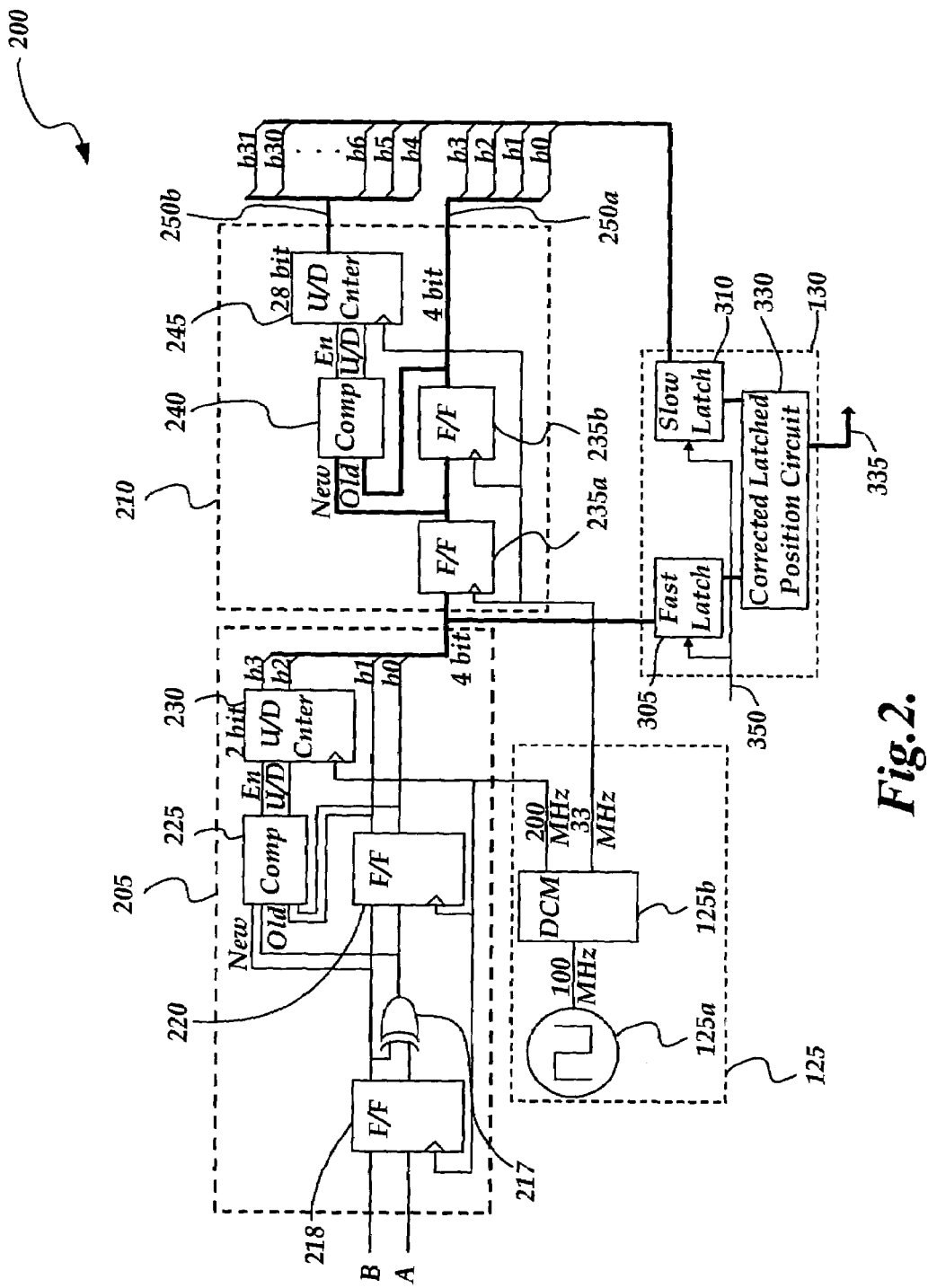
FIG. 2 is a block diagram of a tracking counter which comprises fast and slow tracking counter portions and a position correcting latch according to this invention.

FIG. 2 is a block diagram showing one embodiment of a tracking counter 200 which has been partitioned into a fast tracking counter portion 205 and a slow tracking counter portion 210, in accordance with the present invention. FIG. 2 also shows one embodiment of a clock signal generator 125 and a position correcting latch 130. In this embodiment, the clock signal generator 125 includes a 100 MHz oscillator 125a that provides input to a digital clock manager circuit 125b. The digital clock manager (DCM) 125b may comprise a commercially available component that outputs a fast clock signal and a slower clock signal (e.g. 200 MHz and 33 MHz, respectively, in this embodiment).

The fast tracking counter portion 205 may include an EXOR gate 217, flip-flop registers 218 and 220, a comparator 225 and an up-down counter 230. The slow tracking counter portion 210 may include flip-flop registers 235a and 235b, a comparator 240 and an up-down counter 245. As illustrated, the tracking counter 200 provides 32 bit position information, and the fast tracking counter portion 205 is provides the four least significant bits (LSBs), while the slow tracking counter portion 210 provides the 28 most significant bits (MSBs). However, it will be appreciated that the teachings of the present invention may be applied to tracking counters having more or fewer bits, and the bits may be provided in different proportions between the fast tracking counter portion and the slow tracking counter portion, in various embodiments.

In the specific four bit embodiment of the fast tracking counter portion 205 shown in. FIG. 2, to decode the incoming quadrature signals A and B into two bit binary position information, the A and B signals are input to a 2-bit flip-flop register 218 that outputs A and B signals that are synchronized with the fast clock cycle so that the following logic has the maximum time to settle before the next clock cycle. The EXOR gate 217 inputs the A and B signals from flip-flop 218 and provides the LSB at its output. The B signal from the flip-flop 218 provides the second-LSB.

The two LSBs are input to the flip-flop register 220 and to the "new" inputs of a digital comparator 225. The flip-flop register 220 provides a memory that has an output that lags one fast clock cycle behind its inputs. The output of the flip-flop 200 provides the two "old" LSBs of position information to the "old" inputs of the digital comparator 225, and also as the two LSBs of output from the fast tracking counter portion 205.

The digital comparator 225 may perform a comparison of the current (new) and previous (old) LSBs each fast clock cycle. In one embodiment, this may be every 5 ns, which corresponds to a 200 MHz rate. Based on the comparison operation, the digital comparator 225 outputs an enable signal and an up or down count signal to the up-down counter 230, which may count at the fast clock cycle rate. The up-down counter 230 provides an additional two bits of output to extend the position information provided by the fast tracking counter portion 205 to the four LSBs of position information in this particular embodiment. The four LSBs of position information is output from the fast tracking counter portion 205 at the fast clock cycle rate (e.g. at a rate of 200 MHz).

It should be appreciated the foregoing embodiment of the fast tracking counter portion 205 is exemplary only, and not limiting. For example, in one alternative embodiment, the comparator may be designed such that the A and B signals output by the flip-flop 218 provide its "new" input signals, while the "old" signals are still provided as binary signals as shown in FIG. 2. Such a configuration allows a slight advantage in that the "new" signals may be input to the fast tracking counter portion 205 without waiting for the propagation delay of the EXOR gate 217.

The four LSBs of position information from the fast tracking counter portion 205 are input to an input flip-flop register 235, which provides the inputs of the slow tracking counter portion 210. The input flip-flop register 235a is clocked at a slow clock cycle rate that is slower than the fast clock cycle, (e.g. 6 times slower, or 33 MHz in comparison to a 200 MHz fast clock rate). The four LSBs are output from the flop register 235a to the "new" inputs of a digital comparator 240 and to a flip-flop register 235b. The flip-flop register 235b provides a memory that has an output that lags one slow clock cycle behind its inputs. The output of the flip-flop 235b provides the four "old" LSBs of position information to the "old" inputs of the digital comparator 240, and also as the four LSBs of output from the slow counter portion 210.

The digital comparator 240 may perform a comparison of the current (new) and previous (old) four LSBs each slow clock cycle. In one embodiment, this may be every 30 ns, which corresponds to a 33 MHz rate. Based on the comparison operation, the digital comparator 240 outputs an enable signal and an up or down count signal to the up-down counter 245, which may count at the slow clock cycle rate. The up-down counter 245 provides an additional 28 bits of output to extend the position information provided by the slow tracking counter portion 210 to the 32 bits of position information in this particular embodiment. The 32 bits of position information is updated and/or output from the slow tracking counter portion 210 at the slow clock cycle rate (e.g. at a rate of 33 MHz).

The position correcting latch 130 includes a fast latch portion 305, a slow latch portion 310 and corrected latched position circuit 330. In operation, the position correcting latch 130 may receive an externally generated latch trigger signal 350 as previously outlined. The latch trigger signal 350 may be simultaneously input to the fast latch portion 305 and to the slow latch portion 310. In response, the slow latch portion 310 may input and latch (copy and store) the 32 bit position information present at the output of the slow tracking counter portion 210, and the fast latch portion 310 may input and latch (copy and store) the four bit position information present at the output of the fast tracking counter portion 205. It will be appreciated that, in one embodiment, the position information reflected in the 32 bit position information from the slow tracking counter portion 210 may lag behind the four bit position information from the fast tracking counter portion 205 by nearly two slow clock cycles, due to the position information propagation delays associated with the flip-flop registers 235a, and 235b. Therefore, the four LSBs of the fast latch value and the slow latch value will not match, in general. Advantageously, the four LSBs of the position latched by the fast latch 305 will generally correspond to the displacement transducer position as reflected in the signals A and B to within 3 fast clock cycles (e.g. 15 ns). Therefore, in one embodiment, the corrected latched position circuit 330 processes the position information of the fast latch 305 and the slow latch 310 and produces a corrected full 32 bit position value that corresponds to the position information latched by the fast latch. This corrected 32 bit position value may be output to an external device as a latched position 335 from the position corrected latch 130, as previously outlined with reference to FIG. 1. It will be appreciated that the resulting corrected latched position 335 has an effective timing that is within 3 fast clock cycles (e.g. 15 ns) or less of the time of the latch trigger signal 350, although it will not generally be available for output until some time later when the corrected latched position circuit 330 completes its operations.

In one embodiment, the position correcting latch 130 includes an additional feature that allows the corrected latched position to correspond to the displacement transducer position information embodied in the signals A and B closer to the time that the latch trigger signal 350 is received by the position correcting latch 130. In one embodiment this is accomplished within the fast latch 305 by waiting 3 clock cycles after the latch trigger signal 350 is received before latching the four LSBs of the fast tracking counter. This allows the effect of the A and B signals to propagate through the flip-flop 220 and the remainder of the fast tracking counter 205, before its position is latched by the fast latch 305. The resulting corrected latched position 335 has an effective timing that is within one fast clock cycle (e.g. 5 ns) or less of the time of the latch trigger signal 350, although it will not generally be available for output until some time later when the corrected latched position circuit 330 completes its operations.

Figure 3:
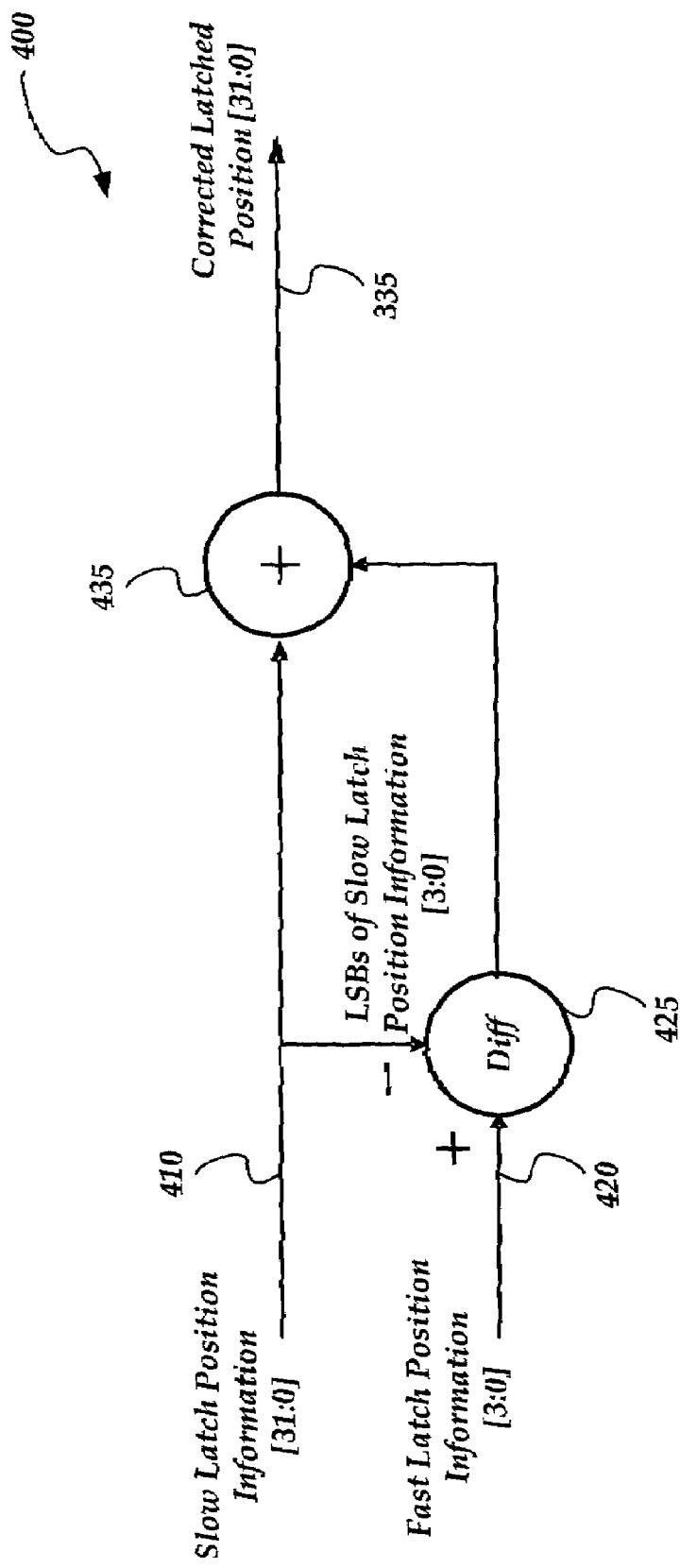
FIG. 3 is a diagram illustrating one aspect of the operations of the position correcting latch of FIG. 2.

FIG. 3 is a diagram 400 illustrating the position correction operations of one embodiment of the corrected latched position circuit 330 of FIG. 2. As shown in FIG. 3, at operations 410 and 420 the corrected latched position circuit 330 inputs the position information from the slow latch 310 and the fast latch 305, respectively. At an operation 425, a difference is determined between the 4 LSBs of the fast latch position information and the slow latch position information. At an operation 435, the difference determined at the operation 425 is added to the full 32 bit slow latch position from the operation 410 to provide the corrected latched position 335. It will be appreciated that, in various exemplary embodiments, the fast clock rate may be fast enough in comparison to the resolution and speed of the displacement transducer that each fast clock cycle increments or decrements the fast tracking counter by at most one displacement increment. Therefore, a four bit fast tracking counter may keep track of up to ±7 position increments. In comparison, in various embodiments, the slow clock rate may be only 6 (or fewer) times slower than the fast clock rate. Therefore, in various embodiments, the 4 LSBs of the fast and slow tracking counters can provide sufficient position information to reflect all position increments that may occur within one slow clock cycle. Thus, only the 4 LSBs are considered in the operations described with reference to FIG. 3. More generally, in various other embodiments, the slow clock is M times slower than the fast clock, and the fast tracking counter outputs N bits of position information, and $2^{(N-1)}>M$. In such embodiments, the corrected latched position circuit 330 may operate on only N LSBs of position information in order to provide the corrected latched position value.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A counter for keeping track of a changing position of a displacement transducer that outputs quadrature signals, the counter comprising:
    a fast tracking counter portion configured to input the quadrature signals and operate at a first clock rate CR1 and output position information comprising a first number N of less significant bits corresponding to the position of the displacement transducer;
    a slow tracking counter portion configured to input the N less significant bits from the fast tracking counter portion and operate at a second clock rate CR2 slower than the first clock rate and output position information comprising a second number P of more significant bits corresponding to the position of the displacement transducer; and
    a position correcting latch that configured to:
        input and latch the N less significant bits of position information from the fast tracking counter portion;
        input and latch at least the P more significant bits of position information from the slow tracking counter portion;
    combine the position information from the fast and slow tracking counter portions to provide (N+P) bits of resulting combined position information, wherein the N least significant bits of the (N+P) bits of resulting combined position information are the same as the latched N less significant bits of position information from the fast tracking counter portion; and
    output the (N+P) bits of resulting combined position information as a corrected latched position value.

2. The counter of claim 1, wherein the second clock rate CR2 is M=CR1/CR2) times slower than the first clock rate CR1, and the counter is configured such that $2^{\wedge}(N-1)>M$.

3. The counter of claim 2, wherein N=4.

4. The counter of claim 3, wherein CR1 is at least 20 MHz and at most 40 MHz.

5. The counter of claim 4, wherein CR2 is at least 100 MHz.

6. The counter of claim 3, wherein M is 6.

7. The counter of claim 1, wherein the position correcting latch is furthermore configured to:
    receive a latch trigger signal; and
    wait a number of clock cycles having the first clock rate CR1 after receiving the latch trigger signal before latching the N less significant bits of position information from the fast tracking counter portion, such that the quadrature signals input to the fast tracking counter portion up to the time of the latch trigger signal are allowed to propagate through the fast tracking counter portion and are reflected in the N less significant bits of position information from the fast tracking counter portion that is latched by the position correcting latch.

8. The counter of claim 7, wherein:
    the fast counter portion comprises at least a first flip-flop register, an EXOR gate, a first digital comparator, and a first up-down counter; and
    the position correcting latch is configured to wait three fast clock cycles for the quadrature signals input to the fast tracking counter portion up to the time of the latch trigger signal to propagate through the at least first flip-flop register, the EXOR gate, the first digital comparator, and the first up-down counter.

9. The counter of claim 1, wherein:
    the slow counter portion comprises second and third flip-flop registers, a second digital comparator, and a second up-down counter;
    the second flip-flop register is connected to input the N less significant bits from the fast tracking counter portion, to down-sample the N less significant bits at the second clock rate, and to output N less significant bits to new data inputs of the second digital comparator and to the third flip-flop register;

the third flip-flop register is configured to delay the N less significant bits by one clock cycle at the second clock rate and is connected to output to the delayed N less significant bits to old data inputs of the second digital comparator;

the second digital comparator is configured to compare the data at its new data inputs to the data at its old data inputs and to output the resulting comparison data to the second up-down counter; and the second up down counter is configured to input the resulting comparison data and to output the P more significant bits of position information.

10. The counter of claim 9, wherein:

the slow tracking counter portion is configured to output both the P more significant bits of position information from the second up-down counter and the delayed N less significant bits from the third flip-flop register; and the position correcting latch is configured to:
input both the P more significant bits of position information and the delayed N less significant bits from the slow tracking counter portion; and
combine the position information from the fast and slow tracking counter portions to provide the (N+P) bits of resulting combined position information, comprising adjusting the delayed N less significant bits from the slow tracking counter portion to be the same as the latched N less significant bits of position information from the fast tracking counter portion.

11. A counter for keeping track of a changing position of a displacement transducer that outputs quadrature signals, the counter comprising:

a fast tracking counter portion configured to input the quadrature signals and operate at a first clock rate CR1 and output position information comprising a first number N of less significant bits corresponding to the position of the displacement transducer;

a slow tracking counter portion configured to input the N less significant bits from the fast tracking counter portion and operate at a second clock rate CR2 slower than the first clock rate and output position information comprising at least a second number P of more significant bits corresponding to the position of the displacement transducer; and a position correcting latch configured to:
input and latch the N less significant bits of position information from the fast tracking counter portion;
input and latch at least the P more significant bits of position information from the slow tracking counter portion;
combine the position information from the fast and slow tracking counter portions to provide (N+P) bits of resulting combined position information, wherein the latched position information from the slow tracking counter portion is adjusted to correspond to the latched position information from the fast tracking counter portion such that potential asynchronous errors due to the different first and second clock rates are eliminated.

12. The counter of claim 11, wherein:

the slow tracking counter portion is configured to input the N less significant bits from the fast tracking counter portion, down-sample the N less significant bits at the second clock rate, and process the down-sampled N less significant bits to provide output position information comprising the P more significant bits of position information and a delayed set of N less significant bits; and the position correcting latch is configured to input and latch (N+P) bits of position information from the slow tracking counter portion, comprising both the P more significant bits of position information and the delayed N less significant bits, and combine the position information from the fast and slow tracking counter portions to provide the (N+P) bits of resulting combined position information, wherein the latched position information from the slow tracking counter portion is adjusted to correspond to the latched position information from the fast tracking counter portion by determining a difference between the delayed set of N less significant bits from the slow tracking counter portion and the N less significant bits from the fast tracking counter portion, and adjusting the latched position information from the slow tracking counter portion based on that determined difference.

* * * * *

UNITED STATES PATENT AND TRADEMARK OFFICE
CERTIFICATE OF CORRECTION

PATENT NO. : 7,535,382 B2  Page 1 of 1
APPLICATION NO. : 11/590960
DATED : May 19, 2009
INVENTOR(S) : B. E. B. Jansson It is certified that error appears in the above-identified patent and that said Letters Patent is hereby corrected as shown below:

| 8 | 16 | after "correcting latch" delete |
| (Claim 1, line 16) | | "that" |
| | | |
| 8 | 32 | after "M=" insert --(-- |
| (Claim 2, line 32) | | |

Signed and Sealed this

Fifth Day of January, 2010

David J. Kappos
*Director of the United States Patent and Trademark Office*